March 4, 1958  J. J. BECK  2,825,768
COMMUTATING DEVICES
Filed April 29, 1955  3 Sheets-Sheet 1

INVENTOR.
JOHN J. BECK
BY Edward M. Farrell
ATTORNEY

March 4, 1958 — J. J. BECK — 2,825,768
COMMUTATING DEVICES
Filed April 29, 1955 — 3 Sheets-Sheet 2

INVENTOR.
JOHN J. BECK
BY Edward M. Farrell
ATTORNEY

March 4, 1958 J. J. BECK 2,825,768
COMMUTATING DEVICES
Filed April 29, 1955 3 Sheets-Sheet 3

INVENTOR.
JOHN J. BECK
BY Edward M. Farrell
ATTORNEY

@@ -

United States Patent Office 2,825,768
Patented Mar. 4, 1958

2,825,768

COMMUTATING DEVICES

John J. Beck, Havertown, Pa., assignor to Tele-Dynamics Inc., a corporation of Pennsylvania Application April 29, 1955, Serial No. 504,860

1 Claim. (Cl. 200—24)

This invention relates to mechanical switching devices or commutators, and more particularly to such devices for high speed commutation or sampling of electrical signals.

In many types of telemetering systems, numerous variable quantities must be measured. For example, when a telemetering system is to be used in association with guided missiles, pilotless aircraft or projectiles, recordation or measurement of acceleration, temperature, pressure, current and numerous other functions are often necessary. Such telemetering systems generally include pickups by which each variable quantity to be measured is converted into a corresponding electrical signal. The electrical signal may then be used to frequency modulate a sub-carrier oscillator within the system. A plurality of such sub-carrier oscillators, generally 18, may then be used to frequency modulate a carrier signal. In many cases the receiving station is located on the ground or in another plane. The carrier signal from the guided missile or other airborne ship is then transmitted to the receiving station. Upon reception of the carrier signal, suitable demodulation means are employed to restore the electrical signals originating at the telemetering pickups. Since these electrical signals are functions of the variable quantities measured, indications of the character of the measured functions are readily attainable.

In a standard telemetering system where a limited frequency band and a limited number of sub-carrier oscillators are employed, it is necessary that a multiplexing system be employed if quantities greater than the number of sub-carrier oscillators are to be measured. In such a multiplexing system, the sub-carrier oscillators may carry a number of measurements sampled in sequence. Such a multiplexing system is well known and used extensively where it is desirable to transmit a maximum amount of information within a limited frequency band.

Mechancal switching devices or commutators are used extensively to perform multiplexing operations since they are relatively simple and offer a maximum amount of reliability. The present invention is concerned with such a mechanical switching device and represents an improvement over the switches used heretofore.

It is an object of this invention to provide an improved mechanical switching device for performing multiple switching operations at a relatively high rate of speed.

It is a further object of this invention to provide an improved mechanical switching device having electrical contacts in which excessive wear is minimized.

It is still a further object of this invention to provide an improved mechanical switching device in which excess noise resulting from associated electrical contacts is minimized.

It is still a further object of this invention to provide an improved mechanical switching device in which a relatively large number of switching operations may be performed with a minimum amount of wasted space.

It is still a further object of this invention to provide an improved mechanical switching device in which a plurality of electrical signals may be sampled at a relatively high rate of speed.

It is still a further object of this invention to provide an improved mechanical switching device in which the phasing of a plurality of sampled electrical signals is maintained relatively constant during operation.

It is still a further object of this invention to provide an improved mechanical switching device in which the phasing between a plurality of sampled electrical signals may be adjusted to a predetermined relationship.

In accordance with the present invention, a mechanical switching device or commutator is provided for high speed commutation of electrical signals. An insulated commutator disc comprises at least two concentric electrically conductive rings secured thereto. One of the rings may include a plurality of segmented elements while the other ring may comprise a continuous element. Each of the segmented elements, as well as the continuous ring element, may be connected to a source of electrical signals. A rotatable conductive element is adapted to electrically contact the two rings. Means for urging the rotatable conductive element into engagement with the continuous ring element and one of the segmented elements are provided. Driving means are also included to rotate the conductive element during the operation of the switching device whereby a number of continuous switching or sampling operations of the electrical signals may be performed.

Other objects and advantages of the present invention will be apparent and suggest themselves to those skilled in the art from a reading of the following specification in connection with the accompanying drawings, in which.

Figure 1:
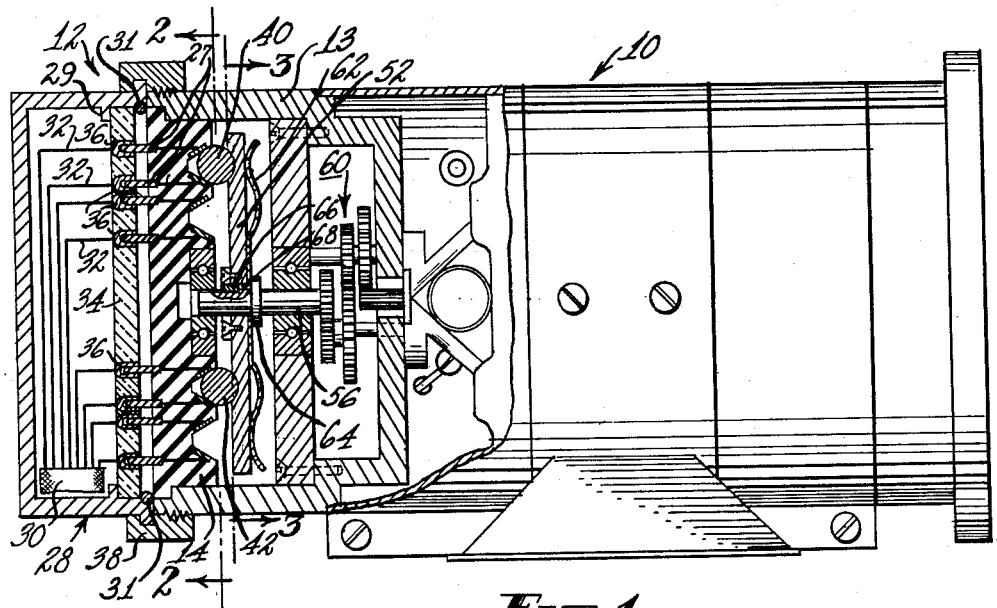
Figure 1 represents a side-elevational view, partly broken away and partly in cross-section of one embodiment of the present invention.
Figures 2, 3:
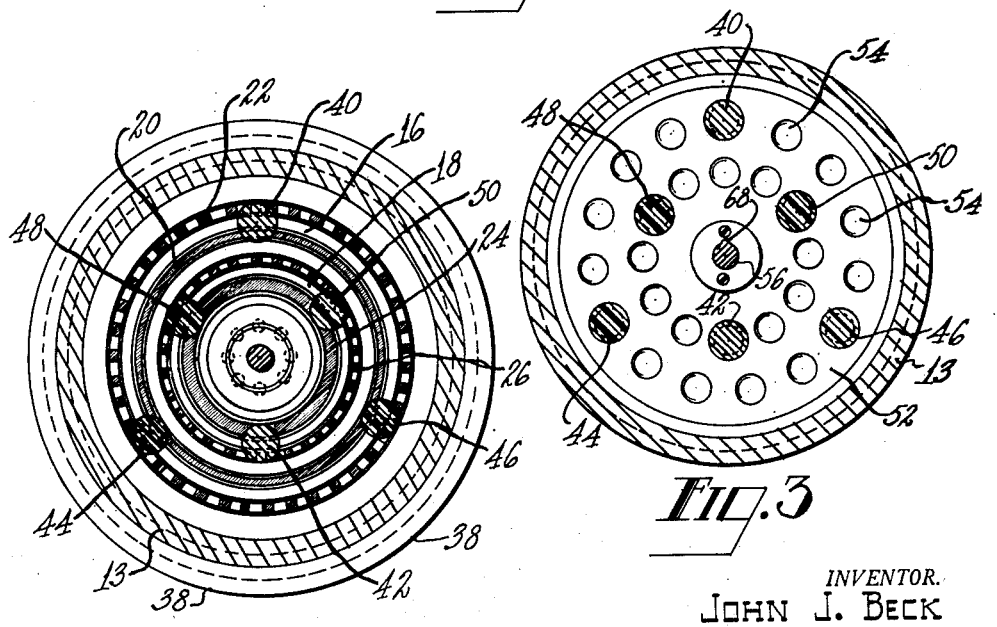
Figure 2 represents a front elevational view of the commutator disc taken along lines 2—2 of Figure 1.
Figure 3 is a view of the driving disc taken along lines 3—3 of Figure 1.

Referring particularly to Figures 1, 2 and 3 of the drawings, a driving means 10 is shown as an electrical dynamotor or rotary voltage converter, but may be any suitable electrical motor or other driving means.

A switching device 12 is disposed within a housing 13 at one end of the driving means and includes an insulated commutator disc 14 having annular grooves 16 and 18 contained therein. A pair of concentric contact rings 20 and 22 are disposed within the annular groove 16 with the ring 20 being in the form of a continuous slip ring and the ring 22 comprising a plurality of segmented elements. Likewise a pair of concentric rings 24 and 26 are disposed within the annular groove 18 with the ring 24 being in the form of a continuous slip ring and the ring 26 comprising a plurality of segmented elements. Each of the continuous rings 20 and 24, as well as each of the segmented elements or contacts of the rings 22 and 26 may be electrically connected to a plurality of prongs 27 which protrude beyond the disc 14. A suitable plug-in connector 28 includes a cable 30 having a plurality of leads 32 leading to an insulated receptacle plate 34. A plurality of electrical receptacles 36 are adapted to receive the prongs 27 of the disc 14. A retaining ring 38 is provided to mechanically attach the plug-in connector 28 to the housing 13. When such a mechanical attachment is made, electrical connections between the receptacles 36 and the prongs 27 are provided. The cable 30 may be connected to a source of electrical signals (not shown). The plug-in connector 28 is provided with a shoulder 29 and a retaining ring 31 to the receptacle plate 34 in fixed position. The retaining ring is disposed in an annular groove within the connector 28.

Rotatable electrically conductive members, or ball brushes, 40 and 42 are adapted to ride within the annular grooves 16 and 18, respectively. Electrically insulated balls 44 and 46, of substantially the same sizes as the ball brush 40, are disposed within the annular groove 16 equally distant from the ball brush 40, as well as equally distant from each other. Likewise, electrically insulated balls 48 and 50, of substantially the same sizes as the ball brush 42, are disposed within the annular groove 18 equally distant from the brush ball 42 and from each other.

A rotor plate or retaining mechanism 52 is provided with a plurality of hemispherical recesses 54 adapted to receive the ball brushes 40 and 42 as well as the insulated balls 44, 46, 48 and 50. The rotor plate 52 is suitably attached to a shaft 56 which may be rotated by the driving means 10 through a gear reduction mechanism 60. A spring member 62 is held in place on the shaft 56 by a collet member 64. A key 66 is provided on the shaft 56 and is adapted to fit into keyway or slot 68 centrally disposed in the rotor plate 52. The spring member 62 is disposed to urge the rotor plate 52 in a forward direction during operation. In the arrangement shown, the rotor plate 52 is free to move axially with respect to the shaft 56, while the rotational movement of the shaft and the plate is maintained in a substantially fixed relationship by the key 66 operatively engaging the slot 68. The spring member 62 urges the rotor plate 52 against the brush balls 40 and 42 as well as against the insulated balls 44, 46, 48, and 50. When sufficient pressure is exerted against the balls, they are forced into the annular grooves 16 and 18 and physically contact each of the pairs of concentric rings within the respective grooves with which they are associated substantially as shown. When the driving means 10 is in operation, the rotor plate 52 turns thereby rotating the balls within the grooves. A switching or sampling operation may be attained as the brush balls maintain continuous electrical contact with the continuous slip rings and periodically engage each of the segmented elements of the adjacent segmented ring. Since the balls are fitted into the hemispherical recesses 54, the relative positions of the balls as well as their relative speeds are maintained constant.

During operation, two separate electrical circuits, one through each pair of rings, may be switched at the same time. For example, one of the pairs of rings may be used to sample the output from a plurality of pickups in a telmetering system. In this case, a separate pickup may be connected across the solid slip ring and one of the elements of the segmented ring. A single pickup may be sampled at periodic intervals as the ball brush electrically engages the solid slip ring and the particular segmented element across which the pickup is connected. The output from the pickup may be sampled once for each revolution of the rotor plate. The electrical signal resulting from the shorting or closing of the circuit associated with a particular pickup may then be used to modulate a sub-carrier oscillator, for example.

The second pair of contact rings may be used to provide means for sequentially providing a series of pickups with an operating potential, for example. Or, on the other hand, the second pair of contacts may be used to provide a series of synchronizing pulses for use in particular circuits associated with the telemetering system. Numerous other pairs of rings may be provided and connected to numerous other electrical circuits. The number of pairs of rings used will be governed by the complexity of the system employed. It may also be desirable, in relatively simple systems, to utilize only a single pair of contact rings.

In practicing the invention, two or more of the elements in the segmented ring may be electrically connected. This may be desirable in systems wherein the width of a pulse is utilized to control a synchronization or other utilization circuit within a system. The segmented elements may also be of different widths instead of the same sizes as shown, if desired. The solid ring may also be split into two or more pieces. Such an arrangement permits a wide area for designing special types of equipment. Dividing or splitting the solid ring into two or more segments may be used to provide means for sampling the output of a pickup, for example, at a faster rate than is possible with a single solid ring at the same speed of rotation. With a split solid ring it is possible to sample an electrical signal at a rate of two or more times per revolution of the rotor plate 52.

The commutator disc 14 may be composed of glass bonded mica, Bakelite, hard rubber, glass, one of various types of plastic compositions or any other suitable insulator material. The concentric rings may be of coin silver plated with rhodium or other materials possessing good wear and low contact resistance. The concentric rings or contacts may be made flush with the grooves of the commutator disc to provide a minimum amount of bouncing of the balls during operation. Such flush contacts may be attained by the application of printed circuitry techniques, standard precise machining methods or by other suitable methods.

The ball brushes 40 and 42 may be beryllium copper or other suitable conductive material plated with rhodium or other suitable hard inert material. The insulated balls 44, 46, 48, and 50 may be of a hard non-conductive material, such as nylon. The rotor plate may be of the same material as the commutator disc, or may be of nylon or other suitable insulated material.

The purpose of the insulated balls within the grooves is to maintain the rotor plate 52 in the same relative plane during the operation of the switching device. More than two balls may be used, if desired. In some cases, it may be desirable to have more than a single conductive ball riding in a single groove. Numerous possibilities and arrangements are possible dependent upon the system employed.

In utilizing the present invention, it is seen that the ball brushes are subjected to a minimum amount of wear. This is due to the fact that the rotation permits a different surface of the ball brush to continuously contact the rings during operation. The angle of the grooves may be designed to various different sizes and shapes and may be made so that the ball brushes spiral within the grooves during operation to further minimize the amount of wear of the ball brushes.

The flush contact rings within the groove permit the ball brushes to ride within the grooves without bouncing. When the pressure exerted on the ball brushes is sufficient, good electrical contact between the ball brushes and the contact rings is maintained. Since the bouncing of the ball brushes is minimized by the flush contacts, less noise is introduced into the electrical circuits associated with the commutator device.

An important feature of the present invention may be seen in that a large number of switching operations may be carried out in a minimum amount of space. It is seen that the ball brushes provide a point of contact with the contact rings within the annular groove. The spacing between the segmented elements need not be too great since the point contact feature of the ball brush minimizes the possibility that the brush will contact more than a single segmented element at one time even with a high speed of rotation.

It is also seen that the point contact achieved by a ball brush permits a relatively constant resistance to exist between the solid ring and a segmented element from the time of making the contact to the time of breaking the contact. In some prior art devices the physical configuration of many types of brushes results in a varying contact resistance during making of contacts, during full contact and while breaking contact. The varying resistance effects the rise and decay time of the sampling pulses thereby necessitating gating or other relatively complicated circuitry to eliminate unstable effects resulting from such variable contact resistance. The present invention eliminated to a great extent the undesirable effects resulting from variable contact resistance thereby making it possible to simplify associated circuitry.

In many applications, it is desirable to adjust the phasing between two or more electrical circuits. In the embodiment of the invention shown, the phasing between electrical circuits may be varied by merely relocating the brush balls in different hemispherical recesses within the rotor plate 52. In some cases, the hemispherical recesses may be replaced by an annular groove or raceway and the brush ball situated in any position desired. When this method of phasing is employed, the pressure of the rotor plate is utilized to maintain the relative positions of the brush balls and the insulated balls. The phase relationship between various electrical signals may also be changed by applying the signals to different segmented elements.

Mechanical means for precisely adjusting the position of the balls at points between the recesses shown may be provided by modifying the design of the rotor plate. Numerous modifications of the rotor or pressure plate are possible and will suggest themselves to those skilled in the art.

In the embodiment shown and described, the solid contact ring is angularly disposed with respect to the segmented ring at an angle less than 180 degrees. It is possible to design the dimensions of the groove to accommodate more than a single pair of contact rings with a single ball brush contacting all the rings. Such an arrangement would necessitate a greater amount of precision design than is necessary with a single pair of rings disposed in a single groove. However, if such an arrangement is employed, brush may control two or more electrical circuits simultaneously.

The housing 13 within which the switching device is located may be air tight, to prevent dirt or other foreign material from gathering on the ring contacts. The switching device may be sealed in an insulating oil, if extreme adverse environmental conditions are contemplated.

In designing the switching device, thermo-electric and contact potential effects should be considered. Different types of material may, if desired, be used to permit cancellation of certain undesired potentials between parts within the device.

Figure 4:
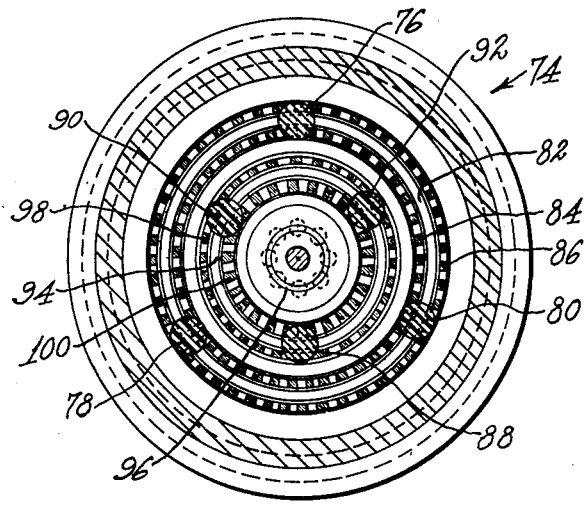
Figure 4 represents a front elevational view of another form of a commutator disc embodying the present invention.

Referring particularly to Figure 4 of the drawing, there is illustrated another type of commutator disc 74 embodying the present invention. An electrically conductive ball brush 76 and insulated ball members 78 and 80 are disposed to ride within an outer annular groove 82. Flushly embedded within the groove 82 is a pair of concentric ring contacts 84 and 86. Each of these ring contacts comprises a plurality of segmented elements. Likewise an electrically conductive ball brush 88 and insulated balls 90 and 92 are disposed to ride within an inner annular groove 94. Flushly embedded within the groove 94 is a pair of concentric ring contacts 98 and 100. Each of the ring contacts 98 and 100 comprise a plurality of segmented elements.

Each of the pairs of contact rings has its segmented elements oppositely and adjacently disposed so that the conductive ball brushes may contact segmented elements on both rings within the groove simultaneously. Each of the segmented elements may be connected to an electrical circuit. It is seen that utilizing this arrangement permits a large number of electrical circuits to be periodically turned on and off. Such a switching device shown may be used in various types of computer applications as well as in connection with sampling circuits of the type described.

The advantages of point contact resistance and high speed switching such as described in connection with Figures 1, 2 and 3 is also attainable in the type of commutator disc shown in Figure 4.

Figure 5:
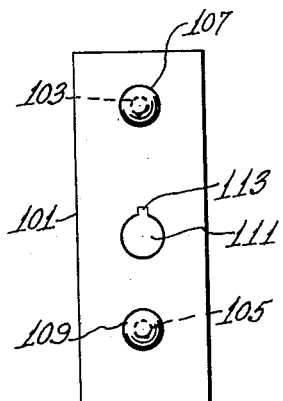
Figure 5 represents another form of driving plate in accordance with the present invention.

Referring particularly to Figure 5, there is illustrated another form of rotor plate which may be employed with the present invention. A plate 101, which may, for example be an insulated strip, such as nylon, includes a pair of apertures 103 and 105. The apertures 103 and 105 are adapted to receive a pair of ball brushes 107 and 109, respectively. A central opening 111 having a notch 113 is provided to engage a shaft 56 and a key 66 such as illustrated in Figure 1. If the plate 101 is associated with a commutator disc having inner and outer grooves, such as illustrated in Figure 1, the ball brush 107 will ride in the outer groove and the ball brush 109 will ride in the inner groove. Such an arrangement, as shown, eliminates the necessity of employing insulated balls.

Figure 6:
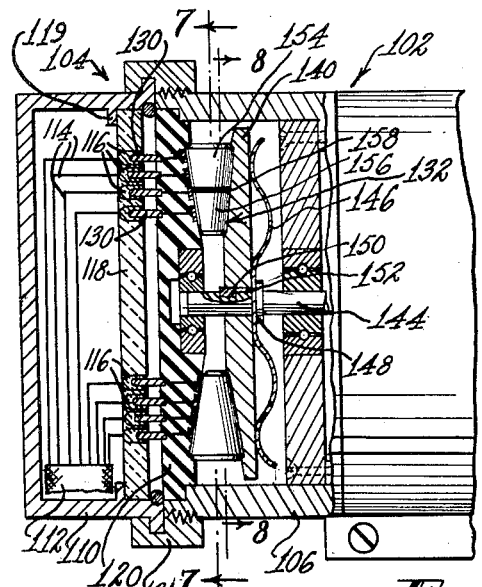
Figure 6 represents a side elevational view, partly broken away and partly in cross-section, of another embodiment of the present invention.
Figure 7:
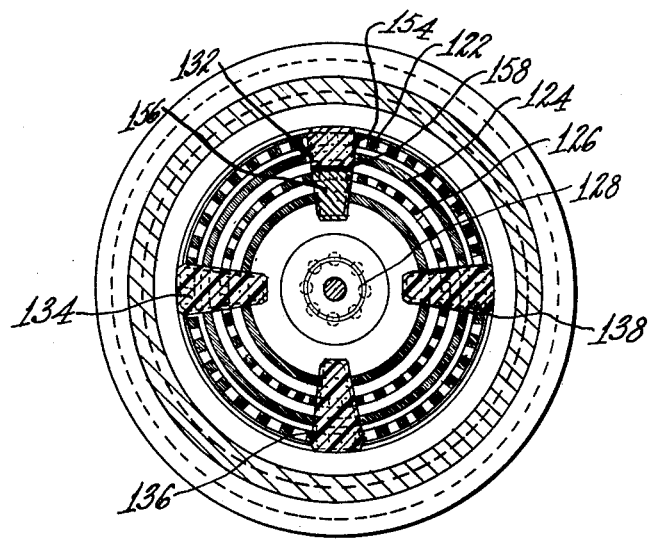
Figure 7 represents a view taken along lines 7—7 of Figure 5.
Figure 8:
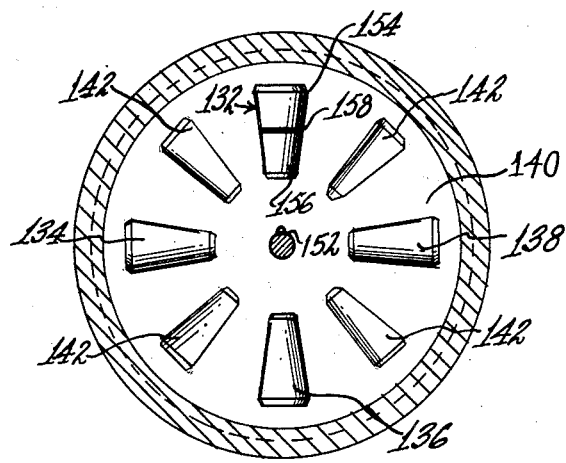
Figure 8 represents a view taken along lines 8—8 of Figure 5.

Referring particularly to Figures 6, 7 and 8, there is illustrated another embodiment of the present invention. A driving means 102 is substantially of the same type as the one shown in Figure 1. A switching device 104 is disposed at one end of a housing 106. A plug-in connector 110 includes a cable 112 having a plurality of conductor leads 114 connected to a plurality of connectors or receptacles 116 embedded within a receptacle plate 118. The receptacle plate 118 is held in place by a shoulder 119 on the plug-in connector and a retaining ring 121 disposed in an annular groove within the connector.

A tapered commutator disc 120 includes an outer pair of concentric rings 122 and 124 with the ring 122 comprising a plurality of segmented elements with the ring 124 being in the form of a continuous slip ring. The commutator disc further includes an inner pair of concentric rings 126 and 128 with the ring 126 comprising segmented elements and the ring 128 being continuous. Each of the continuous rings 124 and 128 may be connected to prongs 130 extending through and beyond the commutator disc 120. The segmented elements of the rings 122 and 126 may also be connected to prongs 130.

The prongs 130 are adapted to be received by the receptacles 116 thereby permitting electrical connections between the rings and a source of electrical signals or other utilization circuit. Each of the rings 122, 124, 126 and 128 are flushly disposed within the commutator disc 120.

A plurality of tapered rollers, 132, 134, 136 and 138 are adapted to ride across the concentric rings 122, 124, 126 and 128 embedded in the commutator disc 120.

A tapered rotor plate 140 is provided with a plurality of recesses 142 adapted to receive the tapered rollers 132, 134, 136 and 138. The rotor plate 140 is suitably mounted on a shaft 144 which may be rotatably driven by the driving means 102. A spring member 146 is held in place by a collet member 148. A key 150 is provided on the shaft to fit into a notch 152, centrally disposed in the rotor plate 140. In the arrangement shown, it is seen that the rotor plate 140 may move axially with respect to the shaft while maintaining the same relative rotational movement of the shaft. The spring member 146 urges the rotor plate 140 into physical engagement with tapered rollers 132, 134, 136 and 138. When sufficient pressure is applied to the rollers, they physically engage the contact rings in the disc 120.

The commutator disc 120 is provided with an upraised peripheral portion to maintain the rollers in the same circular path during operation. The recesses 142 also help to maintain the rollers in the substantially same circular path during operation. Recesses exceeding the number of rollers provide convenient means for changing the location of the rollers to change the phase relationship.

In the embodiment shown, the roller 132 is made of conductive material while the rollers 134, 136 and 138 are composed of an insulated material. The roller 134 is split into two conductive portions 154 and 156 separated by an insulator portion 158. The conductive portion 154 engages the outer pair of contact rings 122 and 124 while the conductive portion 156 engages the inner pair of contact rings 126 and 128. Thus it is seen that a single split roller 132 may be associated with at least two electrical circuits at the same time. The insulated rollers 134, 136 and 138 are provided to maintain substantially the same plane of movement of the rotor plate 140 during operation.

It is seen that the rolling contact arrangement shown permits the contact resistance between the roller and the rings to be substantially constant from the instant of making to the breaking of the contact between the roller and an indvidual segmented element. Undesirable effects caused by a varying contact resistance are thereby avoided.

The number of circuits associated with a single roller may be increased by splitting the roller into a greater number of conductive portions and by increasing the number of rings. It may, in some cases, be desirable to utilize more than a single conductive roller. The rollers may be driven by auxiliary shaft elements mechanically attached to the main driving shaft, if desired. Numerous other possibilities and arrangements utilizing the rolling type contact will suggest themselves to those skilled in the art.

While the switching device has been referred to in connection with a telemetering system, it is realized that it will find application in numerous other fields wherein it is desired to perform switching operations in connection with a plurality of electrical circuits.

What is claimed is:

A high speed mechanical switching device for sampling electrical signals in a telemetering system comprising an electrically insulated commutator disc having a plurality of concentric grooves therein, a pair of concentric contact rings secured to said insulated disc within each of said grooves, each pair of concentric rings including a segmented ring formed of spaced contact members and a continuous ring, conductors connected through said insulated disc for applying electrical signals to each of said pair of contact rings, a conductive ball member riding in each of said plurality of grooves, additional non-conductive ball members riding in each of said plurality of grooves, a rotor plate provided with hemispherical recesses to receive and to maintain in a predetermined phase relationship said electrically conductive ball members and said additional non-conductive ball members, a spring member for urging said rotor plate towards said insulated disc to maintain said electrically conductive ball members in electrical contact with each said pair of concentric rings during rotation of said rotor plate, and a motor disposed to rotate said rotor plate whereby said plurality of electrically conductive ball members and said additional non-conductive ball members ride in said plurality of grooves.

References Cited in the file of this patent

UNITED STATES PATENTS

| | | |
|---|---|---|
| 886,225 | De La Valette | Apr. 28, 1908 |
| 923,185 | Jurgensen | June 1, 1909 |
| 1,651,314 | Beasley | Nov. 29, 1927 |
| 1,694,928 | Rider | Dec. 11, 1928 |
| 2,492,727 | Ballard | Dec. 27, 1949 |
| 2,634,342 | Baechler et al. | Apr. 7, 1953 |
| 2,724,025 | Sevin | Nov. 15, 1955 |